(12) United States Patent
Smith et al.

(10) Patent No.: US 10,323,561 B2
(45) Date of Patent: Jun. 18, 2019

(54) METHODS FOR MONITORING AND MODELLING THERMAL CHARACTERISTICS OF OXIDATION CATALYST DEVICES

(71) Applicant: GM GLOBAL TECHNOLOGY OPERATIONS LLC, Detroit, MI (US)

(72) Inventors: Michael A. Smith, Clarkston, MI (US); Charles E. Dean, Clarkston, MI (US); Raffaele Esposito, Siano (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 15/491,000

(22) Filed: Apr. 19, 2017

(65) Prior Publication Data
US 2018/0306088 A1    Oct. 25, 2018

(51) Int. Cl.
*F01N 3/10*    (2006.01)
*F01N 3/20*    (2006.01)
(Continued)

(52) U.S. Cl.
CPC .......... *F01N 11/002* (2013.01); *B01D 53/944* (2013.01); *B01D 53/9495* (2013.01); *B01J 23/40* (2013.01); *B01J 29/00* (2013.01); *F01N 3/103* (2013.01); *F01N 3/2006* (2013.01); *F01N 9/005* (2013.01); *F01N 11/005* (2013.01); *B01D 2255/102* (2013.01); *B01D 2255/50* (2013.01); *B01D 2258/012* (2013.01);
(Continued)

(58) Field of Classification Search
CPC .............. B01D 53/944; B01D 53/9495; B01D 2255/102; B01D 2255/50; B01D 2258/012; B01J 23/40; B01J 29/00; F01N 11/002; F01N 11/005; F01N 3/103; F01N 3/2006; F01N 9/005; F01N 2370/04; F01N 2510/063; F01N 2560/025; F01N 2560/028; F01N 2560/06; F01N 2560/07; F01N 2900/0422; F01N 2900/1402; F01N 2900/08; F01N 2900/1404; F01N 2900/1602; F01N 2900/1628; F01N 2900/1631
USPC ........................... 60/274, 277, 286, 295, 299
See application file for complete search history.

(56) References Cited

U.S. PATENT DOCUMENTS

| | | | |
|---|---|---|---|
| 6,742,330 B2 * | 6/2004 | Genderen .............. | B01D 53/90 60/286 |
| 2008/0087017 A1 * | 4/2008 | Van Nimwegen ...... | F01N 3/005 60/599 |
| 2011/0281188 A1 * | 11/2011 | Choi ........................ | B01J 8/008 429/420 |

* cited by examiner

*Primary Examiner* — Patrick D Maines
*Assistant Examiner* — Dapinder Singh

(57) ABSTRACT

Methods for monitoring thermal characteristics of oxidation catalyst (OC) catalytic composition(s) (CC) are provided, and comprise communicating exhaust gas to the OC, and determining a temperature change of the CC for the time frame based on a plurality of heat sources including heat imparted to the CC from exhaust gas enthalpy, heat imparted to the CC via oxidation of HC and/or CO in exhaust gas, heat imparted to the CC via water present in the exhaust gas condensing on the CC or heat removed from the CC via water evaporating from the CC, and optionally heat exchanged between the CC and the ambient environment. Heat imparted to the CC via water condensing on the CC can be determined using an increasing relative humidity proximate the CC, and heat removed from the CC via water evaporating from the CC can be determined using a decreasing relative humidity proximate the CC.

20 Claims, 2 Drawing Sheets

(51) Int. Cl.
  *F01N 11/00*  (2006.01)
  *B01D 53/94*  (2006.01)
  *F01N 9/00*   (2006.01)
  *B01J 29/00*  (2006.01)
  *B01J 23/40*  (2006.01)

(52) U.S. Cl.
  CPC .... *F01N 2370/04* (2013.01); *F01N 2510/063* (2013.01); *F01N 2560/025* (2013.01); *F01N 2560/028* (2013.01); *F01N 2560/06* (2013.01); *F01N 2560/07* (2013.01); *F01N 2900/0422* (2013.01); *F01N 2900/08* (2013.01); *F01N 2900/1402* (2013.01); *F01N 2900/1404* (2013.01); *F01N 2900/1602* (2013.01); *F01N 2900/1628* (2013.01); *F01N 2900/1631* (2013.01)

METHODS FOR MONITORING AND MODELLING THERMAL CHARACTERISTICS OF OXIDATION CATALYST DEVICES

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons (HC) and oxides of nitrogen ($NO_x$), and oxides of sulfur ($SO_X$) as well as condensed phase materials (liquids and solids) that constitute particulate matter.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction device (SCR), which generally includes a catalytic composition capable of reducing NOx species. Another type of exhaust treatment device is an oxidation catalyst (OC) device, which is commonly positioned upstream from a SCR to serve several catalytic functions, including oxidizing HC and CO species. Further, OCs can convert NO into $NO_2$ to alter the $NO:NO_x$ ratio of exhaust gas in order to increase the $NO_x$ reduction efficiency of the downstream SCR.

SUMMARY

According to an aspect of an exemplary embodiment, a method for monitoring thermal characteristics of an oxidation catalyst device (OC) is provided. The OC can be configured to receive exhaust gas and includes a catalytic composition (CC) capable of oxidizing one or more of combustable hydrocarbons (HC) and carbon monoxide (CO). The exhaust gas can include HC, CO, and water. The method can include communicating exhaust gas to the OC for a time frame, determining a temperature change of the CC for the time frame based on a plurality of heat sources. The heat sources can include heat imparted to the CC from the exhaust gas enthalpy, heat imparted to the CC via oxidation of the HC and/or CO, heat exchanged between the CC and an ambient environment of the OC, and heat imparted to the CC via water condensing on the CC or heat removed from the CC via water evaporating from the CC. Heat imparted to the CC via water condensing on the CC can be determined using an increasing relative humidity proximate the CC, and heat removed from the CC via water evaporating from the CC can be determined using a decreasing relative humidity proximate the CC. The relative humidity proximate the CC can be determined using the specific humidity of the exhaust gas, the pressure of the exhaust gas proximate the OC, and an initial temperature of the CC temporally proximate the beginning of the time frame. The initial temperature can include a dry temperature determined using heat imparted to the CC from the exhaust gas enthalpy, heat imparted to the CC via oxidation of the HC and/or CO, and optionally heat exchange between the CC and the ambient environment of the OC during the time frame. The relative humidity proximate the CC can be determined using the specific humidity of the exhaust gas, the pressure of the exhaust gas proximate the OC, and a temperature of the CC determined or measured prior to the time frame. Condensed water can be present proximate the CC for at least a portion of the time frame. The CC can include zeolite. The CC can include a platinum group metal.

In another exemplary embodiment, a method for determining the temperature of an oxidation catalyst device (OC) of a vehicle is provided. The vehicle can include an internal combustion engine (ICE) configured to receive and subsequently combust air and fuel and expel the combustion products as exhaust gas. The OC can be configured to receive the exhaust gas and includes a catalytic composition (CC) capable of oxidizing one or more of combustable hydrocarbons (HC) and carbon monoxide (CO). The exhaust gas can include HC, CO, and water. The method can include determining an initial temperature of the CC for a time frame, communicating exhaust gas to the OC during the time frame, determining the thermal energy added to the CC during the time frame based on a plurality of heat sources, converting the thermal energy added to the CC to a CC temperature change, and combining the CC temperature change with the initial temperature. The plurality of heat sources can include heat imparted to the CC from the exhaust gas enthalpy, heat imparted to the CC via oxidation of the HC and/or CO, and heat imparted to the CC via water condensing on the CC or heat removed from the CC via water evaporating from the CC. Water present in the exhaust gas can include one or more of water present in the air, water present in the fuel, and water created during the combustion of the fuel. The time frame can be temporally proximate an ICE cold start, and the initial temperature of the CC can include an ambient temperature proximate the vehicle. The heat imparted to the CC via water condensing on the CC can be determined using an increasing relative humidity proximate the CC, and heat removed from the CC via water evaporating from the CC can be determined using a decreasing relative humidity proximate the CC. The relative humidity proximate the CC can be determined using the specific humidity of the exhaust gas, the pressure of the exhaust gas proximate the OC, and the initial temperature of the CC. The initial temperature can include a dry temperature determined using heat imparted to the CC from the exhaust gas enthalpy, heat imparted to the CC via oxidation of the HC and/or CO, and optionally heat exchange between the CC and an ambient environment of the vehicle. The initial temperature of the CC can be below a water sorption threshold. The thermal energy added to the CC during the time frame can be further determined based on heat exchanged between the CC and an ambient environment of the vehicle. The heat exchanged between the CC and the ambient environment of the vehicle can be determined using one or more of a speed of the vehicle and the ambient temperature. The CC can include zeolite. The CC can include a platinum group metal.

In another exemplary embodiment, a method for determining the temperature of an oxidation catalyst device (OC) of a vehicle is provided. The vehicle can include an internal combustion engine (ICE) configured to receive and subsequently combust air and fuel and expel the combustion products as exhaust gas. The OC can be configured to receive the exhaust gas and includes a catalytic composition (CC) capable of oxidizing one or more of combustable hydrocarbons (HC) and carbon monoxide (CO). The exhaust gas can include HC, CO, and water. The method can include determining an initial temperature of the CC, communicating exhaust gas to the OC for a time frame, determining a temperature change of the CC for the time frame based on a plurality of heat sources, and determining a final temperature of the CC for the time frame by combining the initial temperature of the CC with the temperature change of the CC. The plurality of heat sources can include heat imparted to the CC from the exhaust gas enthalpy, heat imparted to the CC via oxidation of the HC and/or CO, heat exchanged between the CC and an ambient environment of the ICE exhaust gas treatment system, and heat imparted to the CC via water condensing on the CC or heat removed from the CC via water evaporating from the CC. The initial temperature can be below a water sorption threshold.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
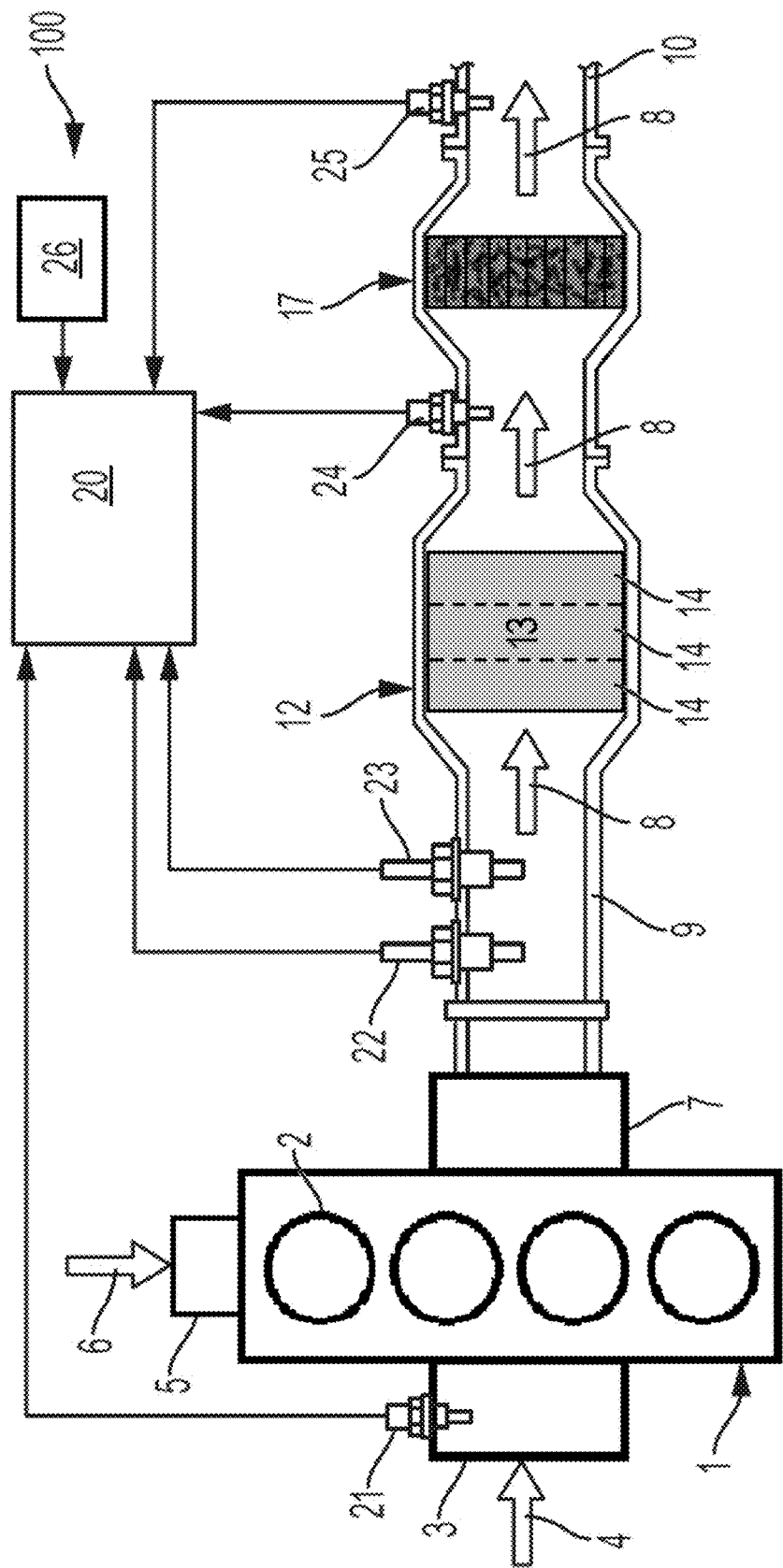
FIG. 1 illustrates an exhaust gas treatment system, according to one or more embodiments.

Generally, this disclosure pertains to method for monitoring and modeling the thermal characteristics of oxidation catalyst devices (OC) which consider energy exchange between the OCs and condensing and/or evaporating water. The methods provided herein allow for enhanced OC monitoring accuracy, particularly relating to oxidation of HC and CO. Further, under-predicting HC and/or CO oxidation can compound by causing under-prediction of selective catalytic reduction devices (SCR) NOx reduction. Accordingly, the methods herein further reduce the occurrence of false NOx reduction failure signals. FIG. 1 illustrates an exhaust gas treatment system 100 utilizing one or more OCs for treating and/or monitoring gas species, such as species of exhaust gas 8 generated by an ICE 1. The exhaust gas treatment system 100 described herein can be implemented in various ICE systems that can include, but are not limited to, diesel engine systems, gasoline direct injection systems, and homogeneous charge compression ignition engine systems.

The ICEs will be described herein for use in generating torque for vehicles, yet other non-vehicular applications are within the scope of this disclosure. Therefore when reference is made to a vehicle, such disclosure should be interpreted as applicable to any application of an ICE. Moreover, optional ICE 1 is included in system 100 for the purposes of illustration only, and the disclosure herein is not to be limited to gas sources provided by ICEs. It should be further understood that the embodiments disclosed herein may be applicable to treatment of any exhaust streams including carbon monoxide (CO), unburned hydrocarbons (HC), or other chemical species which are desirably combusted or otherwise oxidized by OCs.

ICE 1 can include one or more cylinders 2 capable of each accepting a piston (not shown) which can reciprocate therein. ICE 1 includes an air intake 3 for delivering air 4 to the one or more cylinders 2, and a fuel injection system 5 capable of delivering fuel 6 to the one or more cylinders 2. Air 4 and fuel 6 are combusted in the one or more cylinders 2 thereby reciprocating the appurtenant pistons therein. The pistons can be attached to a crankshaft (not shown) operably attached to a vehicle driveline (not shown) in order to deliver tractive torque thereto, for example. ICE 1 can comprise any engine configuration or application, including various vehicular applications (e.g., automotive, marine and the like), as well as various non-vehicular applications (e.g., pumps, generators and the like). Exhaust gas 8 can generally include: CO, HC, water, and oxides of nitrogen ($NO_x$). Constituents of exhaust gas, as used herein, are not limited to gaseous species. As used herein, "$NO_x$" refers to one or more nitrogen oxides. $NO_x$ species can include $N_yO_x$ species, wherein y>0 and x>0. Non-limiting examples of nitrogen oxides can include $NO$, $NO_2$, $N_2O$, $N_2O_2$, $N_2O_3$, $N_2O_4$, and $N_2O_5$. HC refers to combustable chemical species comprising hydrogen and carbon, and generally includes one or more chemical species of gasoline, diesel fuel, or the like. Exhaust gas 8 is expelled from ICE 1 via an exhaust manifold 7 and communicated to OC 12, and optionally particulate filter device (PE) 17 disposed downstream from OC 12, via an exhaust gas conduit 9. Exhaust gas 8 is can be expelled from system 100 via an exhaust pipe 10, for example.

OC 12 is a flow-through device comprising a catalytic composition (CC) 13 and configured to accept exhaust gas 8. OC 12 is generally utilized to oxidize various exhaust gas 8 species, including HC, CO, and $NO_x$ species. CC 13 can be housed within a housing, such as a metal housing, having an inlet (i.e., upstream) opening and outlet (i.e., downstream) opening, or be otherwise configured to provide structural support and facilitate fluid (e.g., exhaust gas) flow through OC 12. As used herein, a component being located upstream relative to a downstream component generally means that it is relatively closer to ICE 1, or that exhaust gas 8 arrives at the upstream component prior to the downstream component. The housing can ideally comprise a substantially inert material, relative to the exhaust gas constituents, such as stainless steel, and may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of OC 12 to exhaust gas conduit 9 and/or another component of the exhaust gas treatment system 100. It should be appreciated that OC 12, including the housing, can include one or more additional components for facilitating in operation of the OC 12, or exhaust gas treatment system 100, including, but not limited to, various sensors as will be described below.

CC 13 can comprise many various catalytically active materials and physical configurations thereof, and can optionally comprise a substrate such as a porous ceramic matrix or the like. Catalytically active materials can comprise periodic group VIIIB metal catalysts, platinum group metal catalysts, metal oxide catalysts, and combinations thereof. Suitable platinum group metals can include Pt, Pd, Rh, Ru, Os or Ir, or combinations thereof, including alloys thereof. In one embodiment, suitable metals include Pt, Pd, and combinations thereof, including alloys thereof. Suitable metal oxide catalyst can include iron oxides, zinc oxides, perovksites, copper oxides, vanadium oxides, magnesium oxides, manganese oxides, and combination thereof, for example. In many embodiments, CC 13 comprises zeolite impregnated with one or more catalytically active base metal components. The zeolite can comprise a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. It is to be understood that the CC 13 is not limited to the particular examples provided, and can include any catalytically active device capable of oxidizing HC, CO, and NOx species.

As exhaust gas 8 traverses the length of OC 12, CC 13 catalyzes the oxidation (e.g., combustion) of HC, CO, and NOx species. Combustion generally involves the oxidation of HC and/or CO species in the presence of oxygen to generate heat, water, and $CO_2$. In some instances, HC and/or CO may be present in exhaust gas 8 as a consequence of undesired incomplete combustion of fuel 6, for example. In other instances, HC may be present in exhaust gas 8 in order to implement various ICE 1 and/or system 100 control strategies. For example, OC 12 can be utilized to oxidize HC to provide heat to system 100 to aid one or more exhaust gas treatment devices achieve light-off temperatures, the temperature at which devices become suitably catalytically active. For example, OC 12 can have a light-off temperature of about 150° C. to about 200° C. In another example, OC 12 can only effect up to a 50% conversion of desired species at or below about 150° C. OC 12 can additionally or alternatively be utilized to oxidize HC for after-injection and auxiliary-injection regeneration strategies. After-injection strategies, such as those used for regeneration of PFs and/or catalysts, manipulate engine calibrations such that fuel 6 after-injected into the engine cylinders is expelled into the exhaust system 100 at least partially uncombusted. When the after-injected fuel 6 contacts OC 12, heat released during oxidation of the fuel 6 is imparted to the exhaust gas treatment system and can aid in regenerating various treatment devices, such as particular filter PF 17, for example. Similarly, auxiliary-injection strategies, such as those used for regeneration of PFs and/or catalysts, inject fuel 6 into system 100 downstream from ICE 1 in order to contact the fuel 6 with OC 12.

OC 12 can additionally or alternatively be utilized to oxidize NOx species which may also form during the combustion of fuel. For example, in some embodiments, OC 12 can be utilized to convert NO into $NO_2$ in order to optimize the exhaust gas $NO:NO_2$ ratio for downstream SCRs and/or selective catalytic reduction filter devices (SCRF) (not shown) which generally operate more efficiently with exhaust gas feed streams having a $NO:NO_2$ ratio of about 1:1. SCRs and SCRF generally include a CC capable of reducing NOx species and are capable of accepting a nitrogen-rich reductant, such as ammonia or urea. Accordingly, in many embodiments, OC 12 is disposed upstream from optional SCRs and SCRF devices. Because NOx conversion can be temperature dependent, particularly below a prescribed light-off temperature, OC 12 NOx conversion yield is often determined based on the temperature of OC 12 or specifically the temperature of CC 13.

Accurate monitoring of OC 12 thermal characteristics, particularly CC 13 temperature, is critical for identifying HC slip (i.e., undesirable pass-through of HC through OC 12), and determining OC 12 conversion performance, for example conversion of NOx and CO species. HC slip can be identified by determining combustion yield, for example. Accordingly, exhaust gas treatment system 100 can includes one or more process sensors, including air intake sensor 21, upstream OC 12 $O_2$ sensor 22, upstream OC 12 temperature sensor 23, downstream OC 12 pressure sensor 24, and downstream PF pressure sensor 25. Ambient sensor 26 can measure ambient conditions such as ambient temperature and ambient pressure, for example. Air intake sensor 21 can represent one or a plurality of sensors capable of measuring air flow rate, humidity, $O_2$ concentration, and/or temperature, among other characteristics of air 4, for example. Process sensors, including sensors 21, 22, 23, 24, 25, and/or 26, can be operatively connected to an electronic engine control module (ECM) 20 that may be configured to accomplish control or monitoring functions of system 100 in accordance with control methods and strategies described herein. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

In the case of monitoring NOx oxidation by OC 12, the temperature of CC 13 is particularly important, because suitable NOx oxidation by OC 12 can improve the NOx reduction performance of a downstream SCR or SCRF by optimizing the SCR or SCRF inlet $NO:NO_2$ ratio. Accordingly, under-prediction of OC 12 NOx oxidation can result in under-prediction of SCR or SCRF NOx reduction. However, often direct measurement of a CC 13 temperature thereof cannot be taken. Instead, the temperature of CC, and/or the proximate area of OC 12, can be inferred, calculated, or otherwise modelled using available process data. A thermal model can be used to determine temperature characteristics of a system (e.g., CC 13), and/or a plurality of subsystems (e.g., bricks 14 of CC 13). The plurality of subsystems can substantially comprise the system as a whole, in some embodiments. The thermal model can be implemented by module 20, for example.

The rate of heat transfer to a system, such as OC 12, CC 13, or brick 14, can be modeled using equation (1):

$$\frac{dQ\_Total}{dt} = \frac{dQ\_Exhaust}{dt} + \frac{dQ\_Oxidation}{dt} + \frac{dQ\_Environment}{dt} \quad (1)$$

wherein, per a given unit time (dt), the total amount of energy transfer (Q_Total) equals the thermal energy of exhaust gas entering the system (Q_Exhaust) plus the energy imparted via oxidation of chemical specie(s) (Q_Oxidation). The model may optionally account for energy exchange with the environment (Q_Environment). Q_Exhaust includes exhaust gas enthalpy (i.e., thermal energy) entering the system. With regards to system 100 Q_Exhaust can be determined using the OC 12 inlet temperature (e.g., upstream OC 12 temperature) and the exhaust gas 8 flow rate. OC 12 inlet temperature can comprise the ICE 1 exhaust manifold 7 outlet temperature, in some embodiments. Q_Oxidation includes heat released from the oxidation of combustable species (e.g., HC and optionally CO) entering the system. With regards to system 100, the total exhaust gas 8 flow, and accordingly the amount of HC and optionally CO entering OC 12, can be determined by the amount of air 4 and fuel 6 entering ICE 1, the combustion characteristics of fuel 6 within ICE 1, and the relevant ICE 1 injection strategies utilized (e.g., after-injection strategies). Fuel 6 introduced to system 100 via an auxiliary injection strategy can further be accounted for, when applicable. Q_Environment includes heat introduced to or lost by the system as a result of the system's interactions with its ambient environment. In one example wherein system 100 is utilized by a vehicle, Q_Environment can consider the ambient conditions (e.g., temperature) proximate a vehicle and/or the speed of a vehicle. As used herein, "ambient" refers to the environment in which system 100, or a vehicle in which system 100 is utilized, is disposed. For example, the ambient pressure of OC 12, or system 100 can be the atmospheric pressure at the location of OC 12 or system 100.

The rate of heat transfer defined by equation (1) can be used to determine a total amount of heat, Q_Total, imparted to the system for a given time frame. Q_Total can be translated to a temperature differential ($\Delta T$) of CC 13 and/or a brick 14 over the given time frame, for example. Additionally, Q_Total can be translated to a final temperature of CC 13 and/or a brick 14 temporally proximate the end of the time frame, for example, such as based upon the $\Delta T$ and the initial temperature of CC 13 and/or a brick 14 temporally proximate the beginning of the time frame. The amount of heat transferred to the system (e.g., OC 12) can be converted to a temperature based upon the various physical characteristics of the system. A $\Delta T$ can comprise the outlet temperature minus the inlet temperature for the CC 13, and/or for individual bricks 14. An exotherm occurs when heat is added to a system, and can be evidenced by positive $\Delta T$ across an OC 12, CC 13, or brick 14, for example. An endotherm occurs when heat is removed from a system, and can be evidenced by a negative $\Delta T$ across an OC 12, CC 13, or brick 14, for example. Where a model calculates the outlet temperature of a plurality of bricks 14, the outlet temperature of an upstream brick 14 can comprise the inlet temperature, or initial temperature, of the immediate downstream brick 14. The inlet temperature of CC 13, or the upstream-most brick 14, can comprise the measured temperature of exhaust gas 8, such as the temperature measured by sensor 23, for example.

Exhaust gas 8 entering OC 12 can further include water. At certain temperature and operating conditions, water can condense, or otherwise adsorb and/or absorb within OC 12 or on CC 13, and add heat thereto. Similarly, at certain temperature and operating conditions, water can evaporate within OC 12, or otherwise desorb from CC 13, and add remove heat therefrom. This effect is particularly pronounced with zeolite CCs 13 and other materials which have high water adsorbing and/or absorbing capabilities, such as alumina ($Al_2O_3$), cordierite, and silicon carbide (SiC).

The methods provided herein account for thermal energy imparted to and removed from OCs 12 and CCs 13 by the condensation and evaporation, respectively, of water, and enhance the accuracy of OC 12 thermal monitoring and modelling. Accordingly the rate of heat transfer to a system, such as OC 12, CC 13, or brick 14, can be modeled using equation (2):

$$\frac{dQ\_Total}{dt} = \frac{dQ\_Exhaust}{dt} + \frac{dQ\_Oxidation}{dt} + \frac{dQ\_H2O}{dt} + \frac{dQ\_Exchange}{dt} \quad (2)$$

wherein per a given unit time (dt), the total amount of energy transfer (Q_Total) equals the sum of Q_Exhaust, Q_Oxidation, and the energy exchanged between condensing and/or evaporating water with OC 12 or CC 13 (Q_$H_2$O). The model may optionally account for energy exchange with the environment (Q_Environment).

Q_$H_2$O can include heat imparted to OC 12 or CC 13 via water condensing on or proximate to the CC 13, or heat removed from OC 12 or CC 13 via water evaporating from or proximate to the CC 13, and can be determined based on a relative humidity proximate CC 13. Relative humidity comprises the ratio of the partial pressure of water in a system to the equilibrium vapor pressure of water at the conditions of the system (i.e., temperature and pressure), and is generally determined based on the specific humidity (i.e., water content) of exhaust gas 8 entering OC 12, the pressure of exhaust gas 8 proximate CC 13, and the temperature of CC 13.

Changes in the relative humidity at various conditions (e.g., temperature and pressure) proximate CC 13 can be converted to thermal energy values which define Q_$H_2$O. When relative humidity is equal to 1, the rate of water condensing and evaporating is equal. Therefore as relative humidity increases past 1, heat is added to the system (i.e., CC 13) as a result of the phase change (i.e., condensation) of water. Similarly, as relative humidity decreases below 1, heat is removed from the system (i.e., CC 13) as a result of the phase change (i.e., evaporation) of water. Specifically, a relative humidity greater than 1 can correspond to heat added to the system and a relative humidity less than 1 can correspond to heat removed from the system. The deviation between the determined relative humidity and 1 can be converted to a thermal energy value determined by a calibratable map, for example. The calibratable map can further include equilibrium vapor pressures for water at varying temperature and pressure conditions (e.g., a steam table), for example. The calibratable map can be specific to a particular OC 12 or CC 13, and can be empirically and/or theoretically derived.

Water in exhaust gas 8 can include water from one or more sources, including water present in the air 4 delivered to one or more ICE 1 cylinders 2, water present in the fuel 6 delivered to one or more ICE 1 cylinders 2, and water created during fuel 6 combustion in ICE 1, among other sources. Water created during fuel 6 combustion can be calculated by a combustion equation tailored to the particular characteristics of air 4, fuel 6, and/or ICE 1. For example, the Arrhenius equation for combustion of fuel 6 within ICE 1 can be modified to determine water as a function of an $O_2$ concentration in exhaust gas 8. $O_2$ concentration in exhaust gas 8 can be measured by sensor 22, or modeled, for example. The pressure of exhaust gas 8 proximate CC 13 can be measured or modeled at a location downstream of ICE 1 or upstream of OC 12, for example. In some embodiments, exhaust gas 8 pressure can comprise the sum of the ambient pressure and the pressure drop across PF 17, for example as measured by sensors 24 and 25, and further optionally account for pressure drop within exhaust gas conduit 9 and other exhaust gas treatment devices as appropriate.

Figure 2:
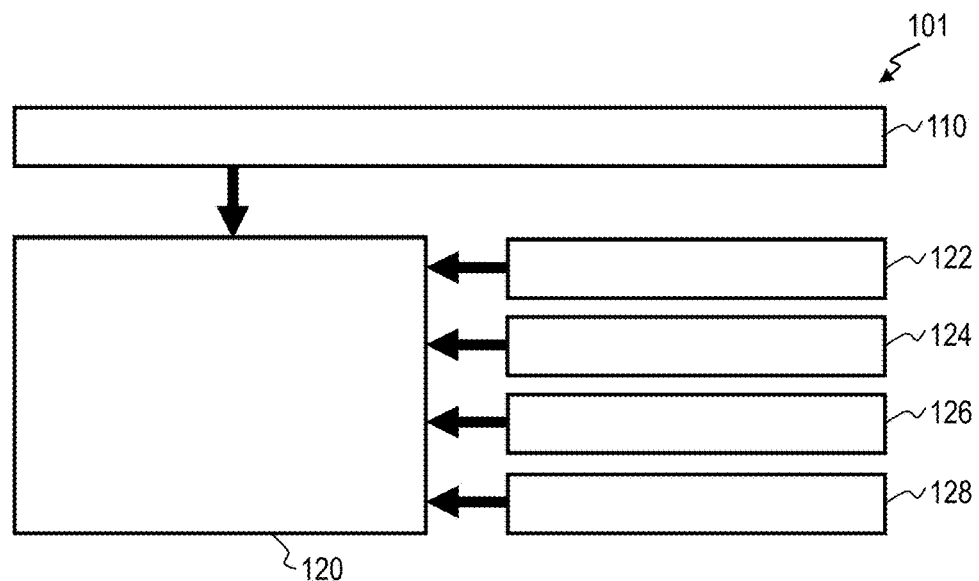
FIG. 2 illustrates a method for monitoring thermal characteristics of an oxidation catalyst device, according to one or more embodiments.
Figure 3:
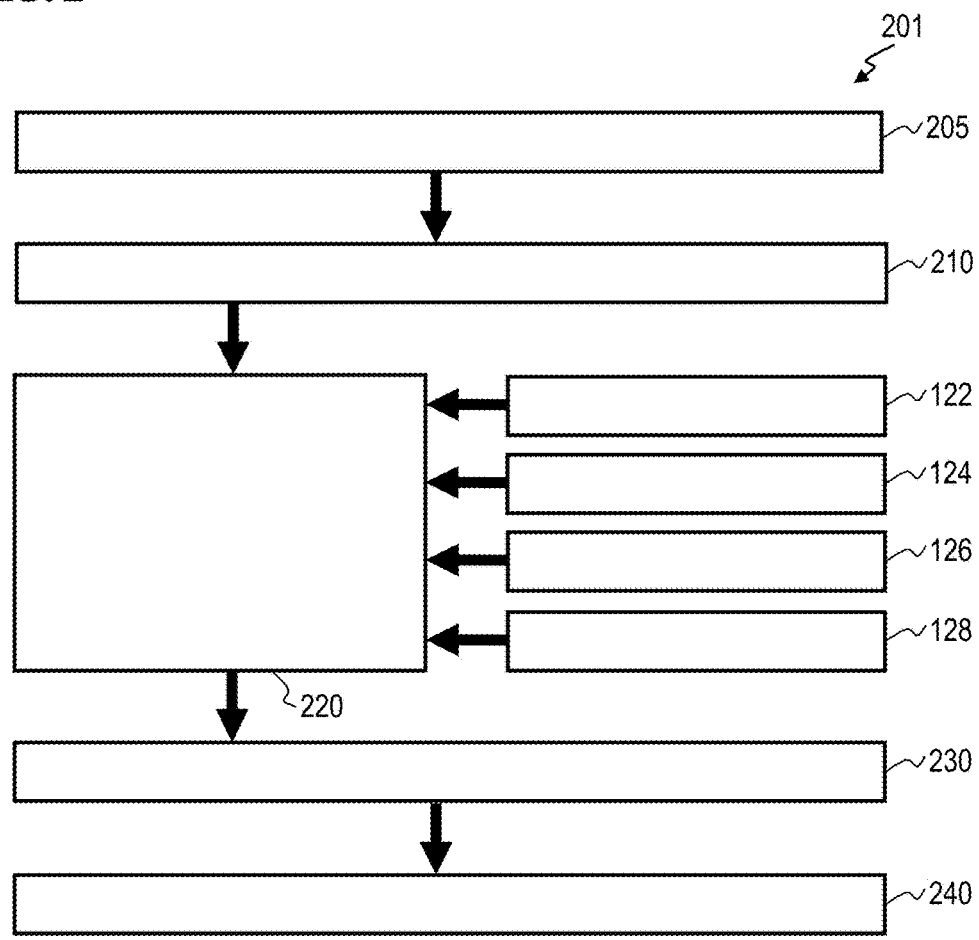
FIG. 3 illustrates a method for determining the temperature of an oxidation catalyst device, according to one or more embodiments.

FIG. 2 illustrates a method 101 for monitoring the thermal characteristics of an OC. FIG. 3 illustrates a method 201 for determining the temperature of an OC. Methods 101 and 201 will be described in relation to system 100, including vehicles utilizing system 100, however the methods shall not be construed to be limited by the features thereof. Methods 101 and 201 are advantageously utilized when condensed water is present proximate CC 13, such as during the time frame during which methods 101 and 201 are conducted. The presence of condensed water ensures that water condenses during the time frame, and/or may evaporate during the time frame such that $Q\_H_2O$ comprises a non-zero value. Specifically, a water exotherm can occur when water condenses or otherwise adsorbs and/or absorbs within OC 12 or particularly on CC 13. Accounting for a water exotherm can eliminate or reduce under-prediction of OC 12 NOx conversion yield, for example. Further, a water endotherm can occur when water evaporates or otherwise desorbs from CC 13. Accounting for a water endotherm can eliminate or reduce over-prediction of OC 12 NOx conversion yield, for example. During the time frame, water may condense and subsequently evaporate from CC 13, and methods 101 and 201 can account for the associated exotherm(s) and endotherm(s).

Similarly, methods 101 and 201 are advantageously utilized when the temperature of CC 13 is below a water sorption threshold for at least a portion of the time frame during which methods 101 and 201 are conducted. A sorption threshold comprises a set of temperature and/or pressure conditions proximate CC 13 in which water is capable of condensing on or proximate CC 13. A sorption threshold can comprise the dew point of water, for example. A sorption threshold can be specific to the characteristics of a particular OC, including the type of CC 13 and amount of CC 13 present in OC 12, and can further include considerations beyond temperature and pressure, including chemical and/or physical adsorption of water with CC 13 and chemical and/or physical absorption of water with CC 13. For example, an OC having about 55 grams of Pt or Pd impregnated beta zeolite CC may have a temperature threshold of about 55° C. to about 65° C. Accordingly, methods 101 and 201 are particularly useful for vehicle cold starts. As used herein, a cold start refers to an ICE 1 start that occurs while the temperature of the OC 12, or particularly CC 13, is lower than an ideal or suitable operating temperature (e.g., a sorption threshold). Additionally or alternatively, a cold start can be identified by an ambient temperature threshold (e.g., below 65° C.), or an ambient temperature less than the ideal or suitable operating temperature.

Method 101 comprises communicating 110 exhaust gas 8 to OC 12 and determining 120 a $\Delta T$ of OC 12 for a time frame using a plurality of thermal energy sources comprising $Q\_Exhaust$ 122, $Q\_Oxidation$ 124 and $Q\_H_2O$ 126. The plurality of thermal energy sources ma optionally further comprise $Q\_Environment$ 128. Exhaust gas 8 comprises water and one or more of combustable HC and CO. $Q\_H_2O$ 126 can be determined using the relative humidity proximate CC 13, wherein relative humidity is calculated using an initial temperature of CC 13 temporally proximate the beginning of the time frame. The initial temperature can be the "dry temperature" of CC 13, determined using a plurality of thermal energy sources comprising $Q\_Exhaust$ 122, $Q\_Oxidation$ 124, and optionally $Q\_Environment$ 128. Dry temperature does not include heat source $Q\_H_2O$ 126. The initial temperature can be a temperature determined or measured prior to the time frame, such as a temperature determined using a prior iteration of method 101 or 201. In some embodiments when the time frame is temporally proximate an ICE 1 cold start, the initial temperature can comprise the ambient temperature.

Method 201 comprises determining 205 an initial temperature of OC 12 or CC 13, communicating 210 exhaust gas 8 to OC 12 for a time frame, determining 220 an amount of thermal energy added to OC 12 during the time frame, converting 230 the determined 220 amount of thermal energy to an OC 12 $\Delta T$ for the time frame, and combining 240 the determined 205 initial temperature with the $\Delta T$ to determine the temperature of the OC 12 or CC 13. The determined temperature of the OC 12 or CC 13 can be the temperature of the OC 12 or CC 13 temporally proximate the end of the time frame. The amount of thermal energy added to OC 12 during the time frame is determined 220 using a plurality of thermal energy sources comprising $Q\_Exhaust$ 122, $Q\_Oxidation$ 124, and $Q\_H_2O$ 126. The plurality of thermal energy sources may optionally further comprise $Q\_Environment$ 128. Exhaust gas 8 comprises water and one or more of combustable HC and CO. $Q\_H_2O$ 126 can be determined using the relative humidity proximate CC 13, wherein relative humidity is calculated using an initial temperature of CC 13 temporally proximate the beginning of the time frame. The initial temperature can be the "dry temperature" of CC 13, determined using a plurality of thermal energy sources comprising $Q\_Exhaust$ 122, $Q\_Oxidation$ 124, and optionally $Q\_Environment$ 128. Dry temperature does not include heat source $Q\_H_2O$ 126. The initial temperature can be a temperature determined or measured prior to the time frame, such as a temperature determined using a prior iteration of method 101 or 201. In some embodiments when the time flame is temporally proximate an ICE 1 cold start, the initial temperature can comprise the ambient temperature.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for monitoring thermal characteristics of an oxidation catalyst device (OC), wherein the OC is configured to receive exhaust gas and includes a first catalytic composition (CC) disposed in a first housing having an inlet and an outlet and capable of oxidizing one or more of combustable hydrocarbons (HC) and carbon monoxide (CO), the method comprising:
communicating exhaust gas to the OC for a time frame, wherein the exhaust gas comprises water and one or more of HC and CO;
determining a temperature change of the CC for the time frame based on a plurality of heat sources comprising:
heat imparted to the CC from an exhaust gas enthalpy,
heat imparted to the CC via oxidation of the HC and/or CO,
heat exchanged between the CC and an ambient environment of the OC; and
heat imparted to the CC via water condensing on the CC or heat removed from the CC via water evaporating from the CC.

2. The method of claim 1, wherein the heat imparted to the CC via water condensing on the CC is determined based on an increase in a relative humidity proximate the CC, and heat removed from the CC via water evaporating from the CC is determined based on a decrease in the relative humidity proximate the CC.

3. The method of claim 2, wherein the relative humidity proximate the CC is determined using the specific humidity of the exhaust gas, the pressure of the exhaust gas proximate the OC, and an initial temperature of the CC temporally proximate the beginning of the time frame.

4. The method of claim 3, wherein the initial temperature comprises a dry temperature determined using heat imparted to the CC from the exhaust gas enthalpy, heat imparted to the CC via oxidation of the HC and/or CO, and optionally heat exchange between the CC and the ambient environment of the OC during the time frame.

5. The method of claim 3, wherein the relative humidity proximate the CC is determined using the specific humidity of the exhaust gas, the pressure of the exhaust gas proximate the OC, and a temperature of the CC determined or measured prior to the time frame.

6. The method of claim 1, wherein condensed water is present proximate the CC for at least a portion of the time frame.

7. The method of claim 1, wherein the CC comprises zeolite.

8. The method of claim 1, wherein the CC comprises a platinum group metal.

9. A method for determining a temperature of an oxidation catalyst device (OC) of a vehicle, wherein the vehicle is comprises an internal combustion engine (ICE) configured to receive and subsequently combust air and fuel and expel the combustion products as exhaust gas, and the OC is configured to receive the exhaust gas and includes a catalytic composition (CC) disposed in a first housing having an inlet and an outlet and capable of oxidizing one or more of combustable hydrocarbons (HC) and carbon monoxide (CO), the method comprising:
determining an initial temperature of the CC for a time frame;
communicating exhaust gas to the OC during the time frame, wherein the exhaust gas comprises water and one or more of HC and CO;
determining the thermal energy added to the CC during the time frame based on a plurality of heat sources comprising:
heat imparted to the CC from an exhaust gas enthalpy,
heat imparted to the CC via oxidation of the HC and/or CO, and heat imparted to the CC via water condensing on the CC or heat removed from the CC via water evaporating from the CC;
converting the thermal energy added to the CC to a CC temperature change; and
combining the CC temperature change with the initial temperature.

10. The method of claim 9, wherein the water present in the exhaust gas includes one or more of water present in the air, water present in the fuel, and water created during the combustion of the fuel.

11. The method of claim 9, wherein the time frame is temporally proximate an ICE cold start, and the initial temperature of the CC comprises an ambient temperature proximate the vehicle.

12. The method of 9, wherein the heat imparted to the CC via water condensing on the CC is determined based on an increase in a relative humidity proximate the CC, and heat removed from the CC via water evaporating from the CC is determined based on a decrease in the relative humidity proximate the CC.

13. The method of claim 12, wherein the relative humidity proximate the CC is determined using the specific humidity of the exhaust gas, the pressure of the exhaust gas proximate the OC, and the initial temperature of the CC.

14. The method of claim 13, wherein the initial temperature comprises a dry temperature determined using heat imparted to the CC from the exhaust gas enthalpy, heat imparted to the CC via oxidation of the HC and/or CO, and optionally heat exchange between the CC and an ambient environment of the vehicle.

15. The method of claim 9, wherein the initial temperature of the CC is below a water sorption threshold.

16. The method of claim 9, wherein the thermal energy added to the CC during the time frame is further determined based on heat exchanged between the CC and an ambient environment of the vehicle.

17. The method of claim 16, wherein the heat exchanged between the CC and the ambient environment of the vehicle is determined using one or more of a speed of the vehicle and the ambient temperature.

18. The method of claim 9, wherein the CC comprises zeolite.

19. The method of claim 9, wherein the CC comprises a platinum group metal.

20. A method for determining a temperature of an oxidation catalyst device (OC) of a vehicle, wherein the vehicle comprises an internal combustion engine (ICE) configured to receive and subsequently combust air and fuel and expel the combustion products as exhaust gas, and the OC is configured to receive the exhaust gas and includes a catalytic composition (CC) disposed in a first housing having an inlet and an outlet and capable of oxidizing one or more of combustable hydrocarbons (HC) and carbon monoxide (CO), the method comprising:
determining an initial temperature of the CC, wherein the initial temperature is below a water sorption threshold;
communicating exhaust gas to the OC for a time frame, wherein the exhaust gas comprises water and one or more of HC and CO;
determining a temperature change of the CC for the time frame based on a plurality of heat sources comprising:
heat imparted to the CC from an exhaust gas enthalpy,
heat imparted to the CC via oxidation of the HC and/or CO,
heat exchanged between the CC and an ambient environment of the ICE exhaust gas treatment system, and heat imparted to the CC via water condensing on the CC or heat removed from the CC via water evaporating from the CC; and determining a final temperature of the CC for the time frame by combining the initial temperature of the CC with the temperature change of the CC.

\* \* \* \* \*